Aug. 1, 1961 J. J. SMITH 2,994,503
ROTARY PLUG VALVE
Filed Sept. 29, 1958 2 Sheets-Sheet 1
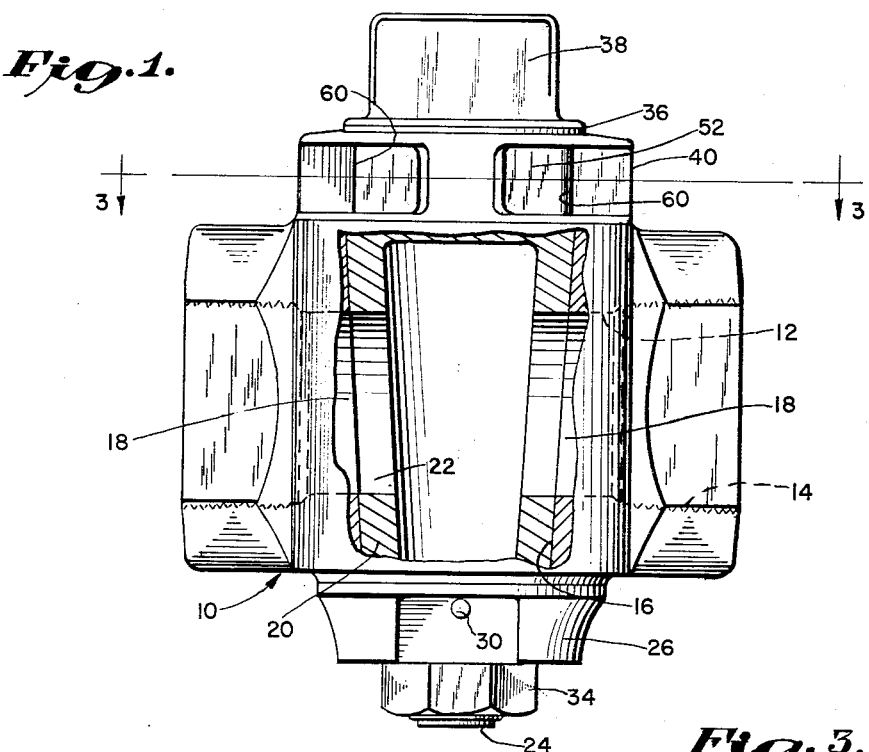
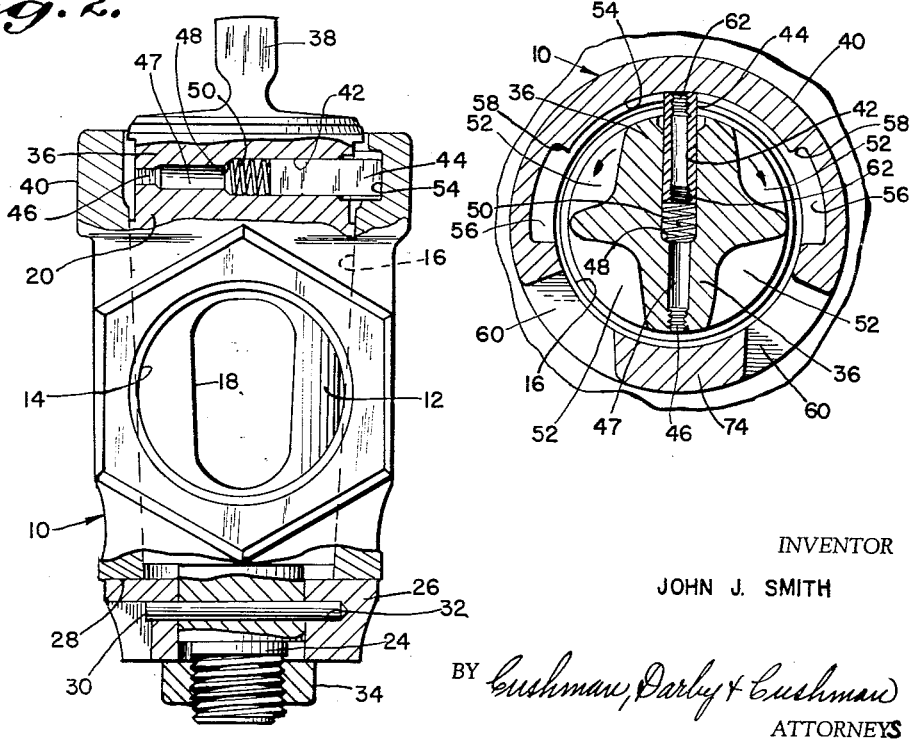
INVENTOR
JOHN J. SMITH
BY Cushman, Darby & Cushman
ATTORNEYS Aug. 1, 1961   J. J. SMITH   2,994,503
ROTARY PLUG VALVE
Filed Sept. 29, 1958   2 Sheets-Sheet 2
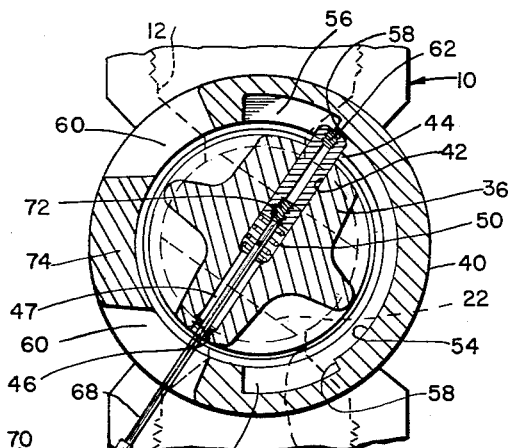
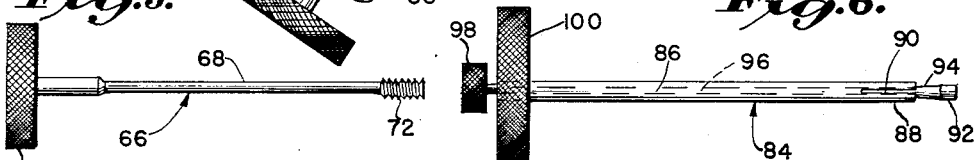
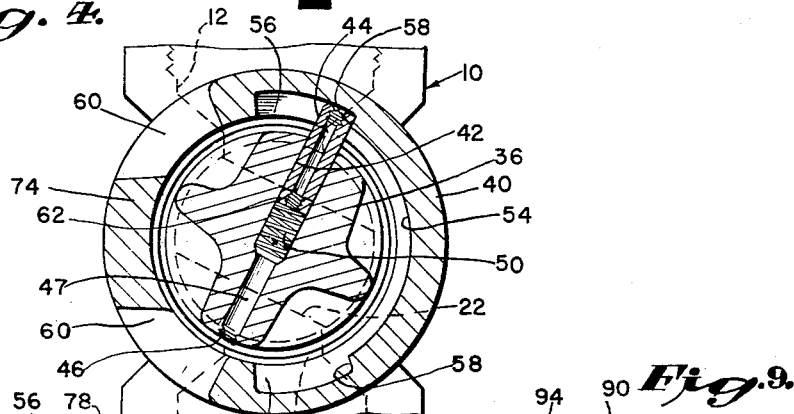
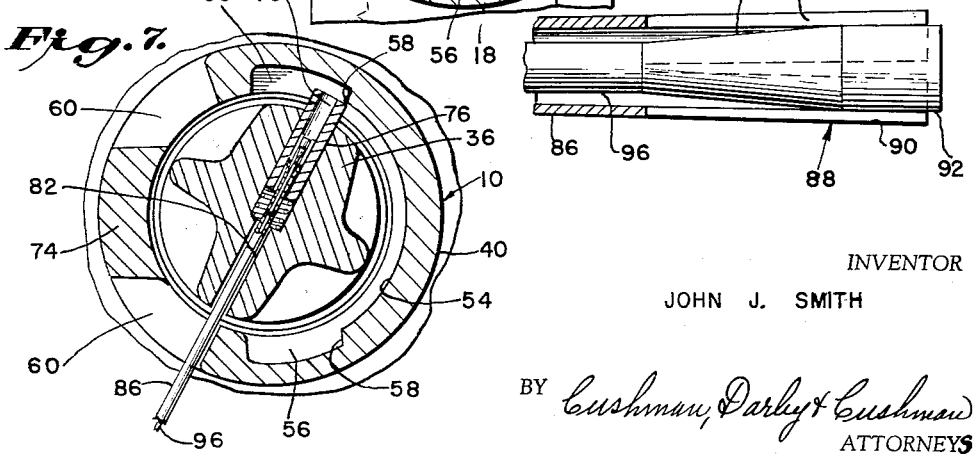
INVENTOR
JOHN J. SMITH
BY Cushman, Darby & Cushman
ATTORNEYS

United States Patent Office 2,994,503
Patented Aug. 1, 1961

2,994,503
ROTARY PLUG VALVE
John J. Smith, Decatur, Ill., assignor to Mueller Co., Decatur, Ill., a corporation of Illinois
Filed Sept. 29, 1958, Ser. No. 764,046
13 Claims. (Cl. 251—110)

This invention relates to rotary plug valves, and, more particularly, to a gas meter stop which, when turned to shut off flow of gas therethrough, automatically locks in a closed position and cannot be unlocked for movement to an open position without a special tool.

It frequently occurs that a householder will attempt to repair or adjust a gas-burning appliance in his own home and, before so doing, turns off the gas for the entire house. The valve controlling the supply of gas to a dwelling usually is known as a meter stop because ordinarily it is connected into the gas supply line immediately in front of the gas meter. After the repairs or adjustments have been made, the householder then usually turns on the gas by opening the meter stop. There have been actual instances, however, where the householder, after turning on the gas, has forgotten to relight the pilot lights of appliances other than the one on which he was working, with a consequent small leakage of gas into the dwelling from the unlit pilots. As a result of such gas leakage explosions actually have occurred with disastrous results.

Accordingly, it is an object of this invention to provide a gas meter stop which when shut off will automatically lock in its shut-off position and cannot again be reopened without the use of a special tool.

It is another object of this invention to provide an automatic-lock-shut meter stop with a completely non-standard tool for reopening the same, such tool to be available only to gas companies.

It is a further object of this invention to provide an automatic-lock-shut gas meter stop which is substantially tamper-proof in that it cannot be reopened by any tools normally available to an ordinary householder and, further, which will automatically lock shut when the valve is turned only sufficiently to shut off the flow therethrough without the necessity of being turned through its normal full 90 degrees of movement in turning from open to closed position.

Other objects and advantages of the invention will become apparent from the following description and accompanying drawings in which:

FIGURE 1 is a side elevational view, partly in vertical section, of a rotary plug valve embodying this invention, with the valve being shown in open position.

FIGURE 2 is an end view partly in vertical section, of the valve shown in FIGURE 1, and taken from the right hand side of the latter figure.

FIGURE 3 is a fragmentary sectional view taken substantially on line 3—3 of FIGURE 1.

FIGURE 4 is a sectional view generally corresponding to FIGURE 3, but showing the valve when it has been turned from open position through an angle just sufficient to shut off flow.

FIGURE 5 is a side view of a special tool for unlocking the valve shown in FIGURES 1–4.

FIGURE 6 is a view corresponding to FIGURE 4 but showing the use of the tool shown in FIGURE 5 to unlock the valve.

FIGURE 7 is a view corresponding generally to FIGURE 4, but illustrating a modified form of this invention and also the use of a modified form of tool to unlock the valve.

FIGURE 8 is a side view of the modified form of tool shown in FIGURE 7.

FIGURE 9 is an enlarged fragmentary view of a portion of the tool shown in FIGURE 8.

Referring now to the drawings there is shown a rotary plug valve having a casing 10 provided with a through passageway 12 that may be interiorly threaded at its opposite ends, as at 14, for connecting the valve into a pipe line (not shown). The through passageway 12 is intersected by a tapered circular plug seat 16 that forms seat ports 18 and also opens at its opposite ends to the exterior of the casing 10. Rotatably mounted in the seat 16 is a correspondingly tapered valve plug 20 having a through port or passageway 22 that is rotatable into and out of alignment with the seat ports 18 to open or close the valve.

At its smaller end the plug 20 is provided with a reduced circular extension 24 threaded at its outer end. The plug 20 is retained in its seat 16 by a locking ring or washer 26 mounted on the plug extension 24 and bearing against an annular surface 28 on the casing 10 at the small end of the seat, the lock ring being secured to the extension by a locking pin 30 which extends transversely through one side of the ring, diametrically through the extension, and is driven into a blind socket 32 on the other side of the ring. A nut 34 is threaded onto the outer end of the extension 24 and bears against the ring 26, which possesses some degree of resilience so that the nut can be adjusted slightly to vary the force with which the plug 20 is engaged with its seat 16. The foregoing plug-retaining construction is substantially tamper-proof in that it precludes any attempts of a householder to remove the plug 20 from its seat 16, while at the same time permitting the aforementioned small adjustments in the plug seating force. This construction is described and illustrated in somewhat greater detail in Patents Nos. 2,653,790 and 2,653,791.

At the larger end of the valve seat 16 the plug 20 is provided with a generally cylindrical unreduced extension 36 having on its outer end a flattened operating handle or part 38 that is aligned with the passageway 22 through the plug in order to provide an exterior indication of whether the valve is opened or closed. The valve casing 10 at the larger end of the seat 16 likewise is provided with a skirt-like extension 40 having a generally cylindrical interior surface snugly surrounding the extension 36 of the valve plug 20.

The plug extension 36 is provided with a diametrically extending bore, having an enlarged section 42 extending inwardly at one end and preferably substantially square in transverse section. Reciprocal in the bore section 42 is a complementary locking pin or bolt 44. At the other end the bore is provided with a short reduced and interiorly threaded section 46 that merges with a somewhat larger intermediate section 47. Between the bore sections 47 and 42 is a shoulder 48. A coil compression spring 50 is interposed between the shoulder 48 and the inner end of the bolt 44 to constantly urge the latter outwardly of the bore section 42 toward the inner surface of the casing extension 40. The exterior of the plug extension 36 may have cut-outs 52 (FIGURE 3) spaced about its circumference inwardly of its outer end for the sole purpose of saving weight and material.

An angular section 54 of the inner surface of the casing extension 40 has a smooth surface slidably engageable by the outer end of the bolt 44 when the valve is in its fully open position, as shown in FIGURE 3. The section 54 is of sufficient angular extent to be slidably engaged by the bolt 44 in all positions of the plug 20 which enable flow to take place through the valve. At the opposite ends of the section 54, however, the extension 40 is provided with interior recesses 56 into one or the other of which the bolt 44 will be automatically projected by the spring 50 when the plug 20 is turned in either of two directions from its open position through an angular extent just sufficient to shut off flow through the valve, i.e., when the passageway 22 through the plug 20 is completely out of alignment with the two seat ports 18, as shown in FIGURE 4. Each of the recesses 56 has an abutment surface 58 engageable by a corresponding side of the locking bolt 44 (when projected into the recess) to prevent rotation of the plug 20, when just closed, back toward its open position, as shown in FIGURE 4. Both of the recesses 56 are of sufficient angular extent to permit the plug 20 to be turned through a full 90 degrees, however, from its open position to its normal fully closed position.

In a sense, the aforedescribed bolt and recess arrangement is in the nature of a latch wherein the recesses 56 constitute keepers for the bolt 44. It also will be noted that the recesses 56 are well below the outer end of the casing extension 40, which rather snugly surrounds the plug extension 36, so that the bolt 44 is not accessible from the exterior of the casing 10 through the very slight clearance which exists between the plug and casing extensions 36 and 40 adjacent their outer ends.

At locations disposed generally diametrically opposite the two recesses 56, the casing extension 40 is provided with cut-out portions or openings 60 which provide access to the outer end of the reduced interiorly threaded bore section 46 of the plug 20 when the latter is locked shut by the bolt 44 and is turned back toward open position sufficiently so that the bolt engages with one or the other of the abutment surfaces 58. The inner end of the bolt 44 is provided with an interiorly threaded recess or socket 62 aligned with the reduced threaded section 46 of the plug bore 42. Preferably both ends of the bolt 44 are provided with like recesses 62 to prevent incorrect assembly of the bolt in the plug bore 42. For convenience of manufacture, the bolt 44 may first be provided with a through bore that is tapped at its opposite ends in order to provide the interiorly threaded recesses 62. The threads in the bolt sockets 62 and in the plug bore section 46 are of identical size and pitch for reasons later explained.

A special tool 66 for opening the valve once it has been locked in its closed position is shown in FIGURE 5. This tool 66 has a cylindrical rod forming a shank 68 that is provided with a handle 70 on one end and an enlarged exteriorly threaded head 72 on the other end. The threads on the head 72 are adapted to mate precisely with the threads in the plug bore section 46 and in the bolt recess 62, and the head is of a length preferably not greatly exceeding that of a reduced and interiorly threaded section 46 of the plug bore 42.

In order to unlock the valve when in its closed position, so that it can be reopened, the valve, i.e., the plug 20, is first turned from its fully closed position until one side of the bolt 44 engages with the abutment surface 58 of the locking recess 56 into which the bolt extends. As described above, when a side of the bolt 44 is engaged with an abutment surface 58, the outer end of the reduced bore section 46 will be accessible from the exterior of the valve casing 10 through one of the openings 60 in the casing extension 40, as shown in FIGURE 4. The head 72 of the tool 66 is then threaded completely through the reduced bore section 46 of the plug 20 and then threaded into the recess 62 in the rear end of the bolt 44. In this position of the tool 66 it will be seen that its shank 68 extends freely through the reduced bore section 46 so that the bolt 44 can be pulled back by pulling back on the tool. Once the bolt 44 has been retracted sufficiently to clear the abutment surface 58, the plug 20 is turned toward open position until the outer end of the bolt 44 will at least overlap the section 54 of the interior surface of the casing extension 40, as shown in FIGURE 6. In this connection the openings 60 are elongated circumferentially of the extension 40 sufficiently to permit such rotation of the plug 20 while the tool 66 is engaged therein. The special tool 66 then can be unscrewed from the bolt 44 back through the reduced bore section 46 so that the valve can be turned toward completely open position with the bolt.

It will be seen that the two openings 60 in the casing extension 40 are separated by an extension portion 74 that completely covers the outer end of the reduced bore section 46 when the valve is in its fully open position, as shown in FIGURE 3. Likewise, the outer end of the reduced bore section 46 is completely covered by other portions of the casing extension 40 when the plug 20 is in either of its two fully open positions. Consequently, the outer end of the reduced bore section 46 is accessible from the exterior of the casing 10 only when the plug 20 is in an intermediate position, thus further discouraging any attempts of a householder to unlock the valve once it has been closed. In this connection it is, of course, intended that a householder will be forced to call the gas company to unlock the valve, and it is presumed that trained personnel of such a company will make sure that all pilot lights are lit after the gas is turned on.

It also will be noted that when the valve is open it can be turned in either direction to close it. Thus, in an emergency the valve may be closed with great dispatch without even having to think about in which direction the plug 20 should be turned to close the valve. It will be noted further that the valve can be opened readily only by the use of the special tool 66. It is contemplated that the interior threads in the reduced bore section 46 and in the bolt recess 62 will be of special non-standard design not readily encountered. Moreover, it is quite improbable that even if a householder should succeed in finding a threaded instrument, such as an elongated threaded bolt, which will mate with the threads in the bore section 46 and bolt recess 62, the instrument would not have the reduced shank and short threaded head essential for proper operation of the same as a bolt-retracting instrument. In this same connection, it will be seen that if a householder should attempt to jam or thread some deformable instrumentality, such as a match stick, through the threaded bore section 46 and into the threaded recess 62 in the end of the bolt 44, the engagement of such instrumentality with the threads in the bore section 46 would again prevent proper operation of such instrumentality as a bolt-retracting tool.

Referring now to FIGURE 7 of the drawings there is shown a modified form of this invention that is constructed to use a somewhat different type of bolt-retracting tool. In this modification of the valve, wherein only the plug bore and bolt differ from the above-described embodiment, the bolt 76 is provided with a smooth-walled through bore 78. The plug reduced bore section 82, at the end of the bore opposite the bolt 76, likewise is smooth-walled and preferably of substantially the same diameter as the through bore 78 in the bolt.

A bolt-retracting tool 84 for use with the modified form of the valve is shown in FIGURES 8 and 9 and comprises an elongated operating tube 86 of a diameter slightly less than the interior diameters of the reduced bore section 82 and the bolt bore 78. Extending inwardly from the operating end or head 88 of the tube 86 are a plurality of elongated slots 90, four such being shown in the drawings, in order to render the head expansible. Preferably, the tube 86 is formed of resilient material so that contraction of the head 88 will take place when the expansive forces thereon are relieved. Expansion of the head 88 may be accomplished by an expander head 92 of a diameter preferably not exceeding that of the tube 86 and having a rearwardly-tapering frusto-conical portion 94 which cooperates with the interior end edge of the head 88 to expand the latter when the expander head 92 is moved into the tube 86. The expander head 92 is secured on the end of a draw rod 96 that extends rearwardly through the tube 86 and has an operating handle 98 on its rear end. Likewise, the rear end of the tube 86 has an operating handle 100 thereon.

In order to use the tool 84 to unlock the modified form of a valve embodying this invention, the expansible end 88 is inserted through the reduced bore section 82 and into the bore 78 in the bolt 76. The operating tube 86 is then held in this position by its handle 100 while the draw rod 96 is pulled to the rear, by its handle 98, to thus expand the head 88 into tight frictional engagement with the interior of the bolt bore 78, as shown in FIGURE 7. This engagement will be sufficiently strong, so that the tube 86 and rod 96 can be pulled rearwardly as a unit to retract the bolt 76. Once the bolt 76 has been retracted and the valve plug turned sufficiently to allow the bolt to rest upon the interior section 54 of the casing extension 40, the draw rod 96 can be forced forwardly sufficiently to permit contraction of the tube head 86 so that its frictional engagement with the interior of the bolt recess 78 will be relieved. Whereupon the special tool 84 can be removed through the reduced bore section 82 and the valve turned to its fully opened position.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

I claim:

1. In a rotary plug valve having a body member provided with a flow passageway intersected by a plug seat and a ported plug member rotatable in the seat to open and close the valve, the angle through which the plug member is rotatable between fully open and fully closed positions being greater than that through which it is necessary to rotate the plug member from fully open position in order to shut off flow through the valve, the combination of: a bore in one of the members adjacent one end, and transverse to the axis, of the seat; a latch bolt reciprocable in said bore; spring means interposed between said bolt and an abutment in said bore to constantly urge said bolt out of one end of said bore toward the other of the members; inaccessible recessed keeper means in the other member, said keeper means including an abutment surface engageable by a side of said bolt to lock the plug member against movement to open position on rotation of the plug member from its open position through an angle just sufficient to shut off flow through the valve and said keeper means being of an extent to permit continued rotation of the plug member to fully closed position, the other end of said bore being exposable to the exterior of the body member at least when said bolt is engaged with said abutment surface, and a recess in the inner end of said bolt having side walls adapted to be engaged by separate key means insertable into said bore from said other end thereof for retracting said bolt.

2. The structure defined in claim 1 in which the plug member is rotatable in either direction from its valve-open position in order to close the valve and the keeper means includes a pair of angularly-spaced oppositely-facing abutment surfaces alternatively engageable by sides of the bolt to lock the plug member against movement to open position on rotation of the plug member from its open position in either direction through an angle just sufficient to shut off flow through the valve.

3. The structure defined in claim 1 in which a section of the length of the plug bore is reduced and interiorly threaded adjacent the bore other end, and the bolt end recess is circular, aligned with, and threaded interiorly identically to, said bore section, whereby a bolt-retracting key having a reduced shank and an end section exteriorly threaded to mate with said bore section and recess can be screw completely through said bore section and separately into said bolt recess with the shank then fitting loosely in said bore section.

4. The structure defined in claim 1 in which a section of the length of the bore is reduced and interiorly threaded adjacent the bore other end, and the bolt end recess is circular, aligned with, and threaded interiorly identically to, said bore section, and including a bolt-retracting key having a reduced shank and an end section threaded exteriorly to mate with, and be screwed completely through, said bore section and separately into said bolt end recess.

5. The structure defined in claim 1 in which a section of the length of the bore is reduced and smooth-walled adjacent the bore other end, and the bolt end recess is circular, smooth-walled, and aligned with, and of a diameter at least as small as that of, said bore section, whereby a bolt-retracting key having an expansible end portion can be inserted through the bore section into said bolt end recess and expanded into frictional engagement with the side walls thereof.

6. The structure defined in claim 1 in which a section of the length of the bore is reduced and smooth-walled adjacent the bore other end, and the bolt end recess is circular, smooth-walled, and aligned with, and of a diameter at least as small as that of, said bore section, and including a bolt-retracting key having an expansible end section insertable through said bore section into said bolt end recess for expansive frictional engagement with the side walls thereof.

7. In a rotary plug valve having a body provided with a flow passageway intersected by a plug seat and a ported plug rotatable in the seat to open and close the valve, the combination of: a skirt-like extension on the body closely surrounding the plug at one end of the seat; a transverse bore in the plug adjacent said extension; a locking bolt reciprocable in said bore; spring means interposed between one end of said bolt and an abutment in said bore to constantly urge said bolt out of one end of said bore toward the inner surface of said extension; inaccessible recessed keeper means in said surface, said bolt being alignable with said keeper means for projection into locking engagement therewith on rotation of said plug from open to closed position to thereby lock the valve closed; said extension having at least one opening therein to expose the outer end of said bore to the exterior of the valve body when said bolt is engaged with said keeper means; and a recess in the inner end of said bolt having side walls adapted to be engaged by separate key means insertable into said bore from said other end thereof for retracting said bolt.

8. The structure defined in claim 7 in which the keeper means includes an abutment surface engageable by a side of the bolt to lock the plug against movement to open position on rotation of the plug from its open position through an angle just sufficient to shut off flow through the valve.

9. The structure defined in claim 7 in which the plug is rotatable in either direction from its valve-open position in order to close the valve and the keeper means includes a pair of angularly-spaced oppositely-facing abutment surfaces alternatively engageable by sides of the bolt to lock the plug against movement to open position on rotation of the plug from its open position in either direction through an angle just sufficient to shut off flow through the valve.

10. The structure defined in claim 7 in which a section of the length of the plug bore is reduced and interiorly threaded adjacent the bore other end, and the bolt end recess is circular, aligned with, and threaded interiorly identically to, said bore section, whereby a bolt-retracting key having a reduced shank and an end section threaded exteriorly to mate with said bore section and recess can be screwed completely through the former and separately into the latter with the shank then fitting loosely in said bore section.

11. The structure defined in claim 7 in which a section of the length of the bore is reduced and interiorly threaded adjacent the bore other end, and the bolt end recess is circular, aligned with, and threaded interiorly identically to, said bore section, and including a bolt-retracting key having a reduced shank and an end section threaded exteriorly to mate with, and be screwed completely through, said bore section and separately into said bolt end recess.

12. The structure defined in claim 7 in which a section of the length of the bore is reduced and smooth-walled adjacent the bore other end, and the bolt end recess is circular, smooth-walled, and aligned with, and of a diameter at least as small as that of, said bore section, whereby a bolt-retracting key having an expansible end portion can be inserted through the bore section into said bolt end recess and expanded into frictional engagement with the side walls thereof.

13. The structure defined in claim 7 in which a section of the length of the bore is reduced and smooth-walled adjacent the bore other end, and the bolt end recess is circular, smooth-walled, and aligned with, and of a diameter at least as small as that of, said bore section, and including a bolt-retracting key having an expansible end section insertable through said bore section into said bolt end recess for expansive frictional engagement with the side walls thereof.

References Cited in the file of this patent

UNITED STATES PATENTS

| | | |
|---|---|---|
| 102,290 | Maxwell | Apr. 26, 1870 |
| 359,714 | Deming | Mar. 22, 1887 |
| 846,257 | Stratiff | Mar. 5, 1907 |
| 924,423 | Brandenburg | June 8, 1909 |
| 1,057,609 | Young | Apr. 1, 1913 |
| 1,923,025 | Morse | Aug. 15, 1933 |
| 2,943,837 | Noble | July 5, 1960 |